United States Patent [19]

Kuhfuss, Jr.

[11] 4,053,409
[45] Oct. 11, 1977

[54] REMOVABLE FILTER ASSEMBLY WITH BYPASS VALVE

[75] Inventor: Alvin L. Kuhfuss, Jr., Morton, Ill.

[73] Assignee: Caterpillar Tractor Co., Peoria, Ill.

[21] Appl. No.: 690,467

[22] Filed: May 27, 1976

Related U.S. Application Data

[63] Continuation of Ser. No. 562,383, March 26, 1975, abandoned.

[51] Int. Cl.$^2$ ............................................. B01D 29/04
[52] U.S. Cl. ..................................... 210/130; 210/172; 210/223; 210/315; 210/429
[58] Field of Search ............... 210/130, 132, 133, 167, 210/168, 171, 172, 222, 223, 315, 429, 441, 443, 454, 455

[56] References Cited

U.S. PATENT DOCUMENTS

| | | | |
|---|---|---|---|
| 2,459,534 | 1/1949 | Kennedy | 210/223 |
| 2,589,920 | 3/1952 | Beckett | 210/130 |
| 2,669,707 | 2/1954 | Ehrman | 210/130 X |
| 3,164,551 | 1/1965 | Nugent | 210/223 |
| 3,294,238 | 12/1966 | Rosaen et al. | 210/315 X |
| 3,313,418 | 4/1967 | Rosaen | 210/130 X |
| 3,342,332 | 9/1967 | Kudlaty | 210/315 X |
| 3,368,679 | 2/1968 | Bozek | 210/130 X |
| 3,368,680 | 2/1968 | Bozek | 210/130 X |
| 3,543,935 | 12/1970 | Detrick | 210/315 X |
| 3,841,489 | 10/1974 | Combest et al. | 210/223 |

Primary Examiner—Thomas G. Wyse
Assistant Examiner—Robert H. Spitzer
Attorney, Agent, or Firm—Phillips, Moore, Weissenberger, Lempio & Majestic

[57] ABSTRACT

A filter assembly comprises a cover member detachably mounted on a stationary support and a support member attached to the cover member in axially spaced relationship therefrom. A tubular screen, having a filter disposed therein, is disposed axially between the cover and support member and defines an annular passage between it and the filter. In normal operation, fluid is communicated from an inlet, through the screen and filter and to an outlet. When the pressure of the fluid in the passages exceeds a predetermined level, the fluid is communicated from the inlet and through the screen and passage to open a bypass valve mounted in the cover to communicate the fluid directly to the outlet. A plurality of magnets are preferably secured on an underside of the support member and adjacent to the inlet to uniformly disperse the fluid thereby and to pick up metallic contaminants.

12 Claims, 3 Drawing Figures

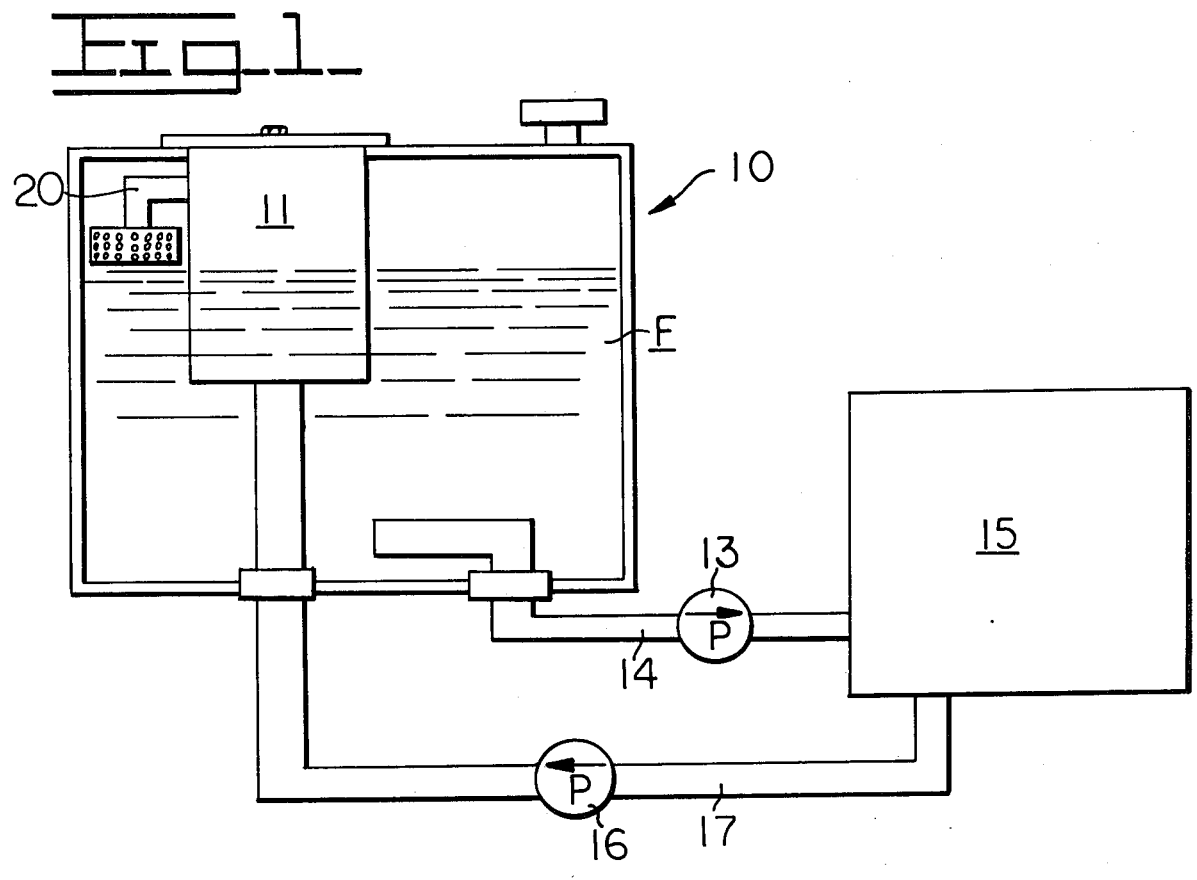
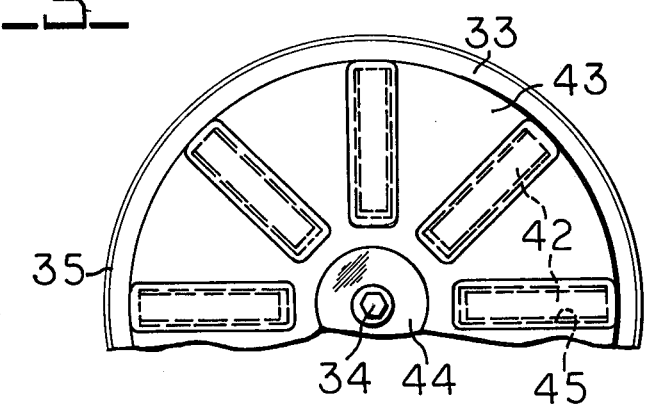

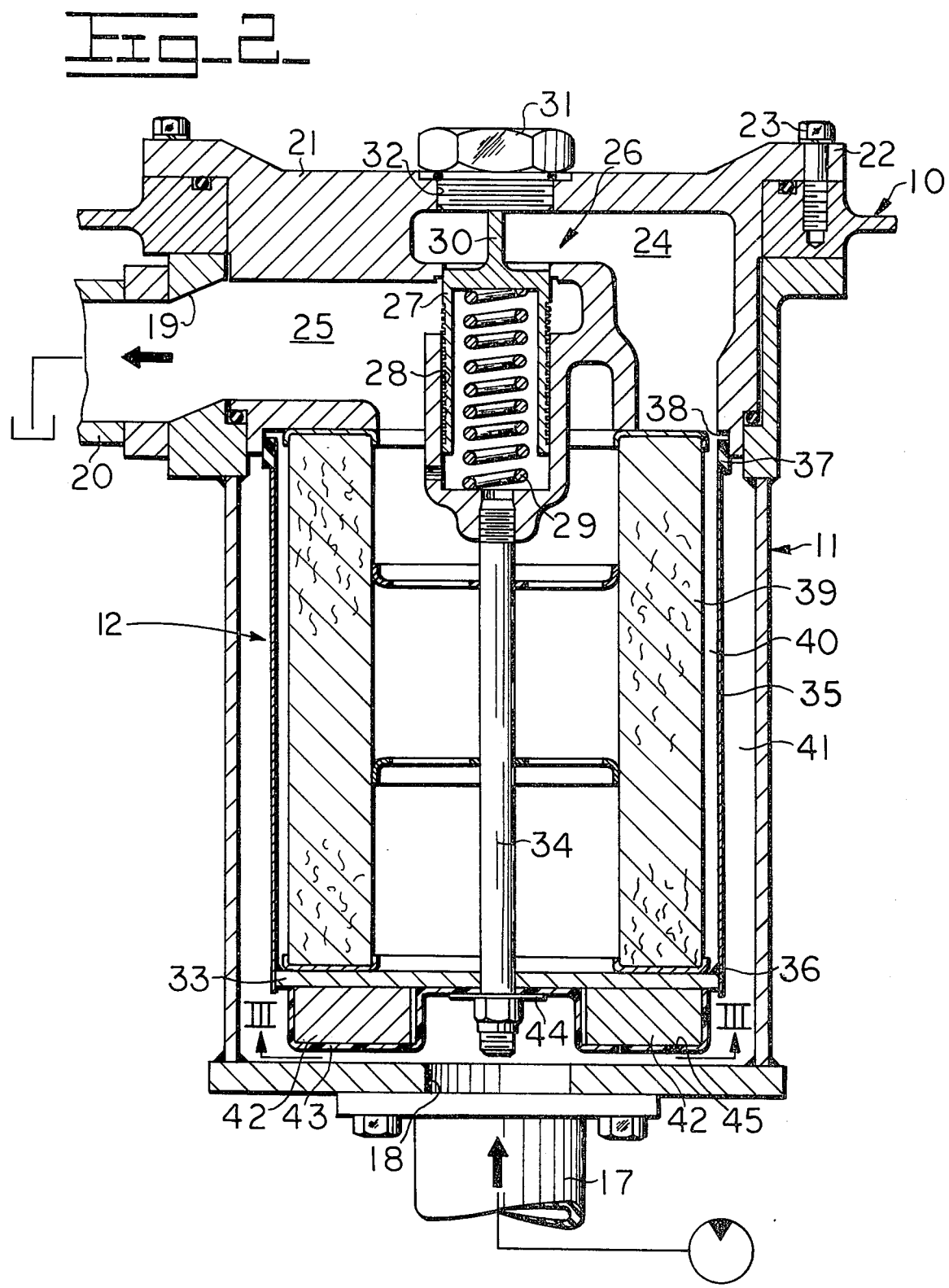

REMOVABLE FILTER ASSEMBLY WITH BYPASS VALVE

This application is a continuation of U.S. patent application ser. No. 562,383, filed on Mar. 26, 1975 by Alvin L. Kuhfuss Jr., for "Removable Filter Assembly with Bypass Valve, now abandoned.

BACKGROUND OF THE INVENTION

Conventional filter assemblies for filtering-out contaminants from a lubricating or working fluid normally comprise a stationary housing having a annular cartridge-type filter removably mounted therein. A bypass valve is normally incorporated in the filter assembly to directly communicate fluid from the inlet to the outlet thereof when the filter becomes clogged, for example. Filter assemblies of this type are exemplified by U.S. Pat. Nos. 2,886,180; 3,556,300; and 3,628,661, all assigned to the assignee of this application.

One disadvantage of such filter assemblies is the inability to screen-out contaminants during the bypassing condition of filter operation. In addition, the bypass valve must be removed as a unit with the filter assembly and thereafter disassembled therefrom for servicing purposes. Also, many conventional filter assemblies, employing magnets therein to pick up metallic particles, dispose the magnets in a position whereby their effectiveness is limited.

SUMMARY OF THIS INVENTION

An object of this invention is to provide an improved removable filter assembly which is adapted to screen-out contaminants during its normal filtering and bypass conditions of operation. The filter assembly comprises a cover member detachably mounted on and disposed within a stationary housing, a support member attached to the cover member in axially spaced relationship therefrom, a tubular screen defining an annular chamber between it and the housing, a tubular filter disposed within the screen and positioned radially inwardly therefrom to define and annular passage therebetween and bypass valve means for communicating lubricating fluid from the inlet, through the chamber and passage and to the outlet directly when the filter becomes clogged, for example.

In the preferred embodiment of this invention, the bypass valve means is mounted in the cover member and means are provided on the cover for solely exposing the bypass valve means for permitting expeditious removal thereof from the cover member. In addition, a plurality of magnets are preferably disposed on an underside of the support member in opposition to the inlet to increase their effectiveness in picking up metallic particles and to uniformly disperse the fluid radially outwardly therefrom.

BRIEF DESCRIPTION OF THE DRAWINGS

Other objects of this invention will become apparent from the following description and accompanying drawings wherein:

FIG. 1 schematically illustrates the filter assembly of this invention integrated into a fluid circuit;

FIG. 2 is an enlarged longitudinal sectional view of the filter assembly; and

FIG. 3 is a bottom plan view of the filter assembly taken in the direction of arrows III—III in FIG. 2, illustrating a plurality of bar magnets employed thereon.

DETAILED DESCRIPTION

FIG. 1 illustrates a tank 10 for retaining a lubricating or working fluid F, such as oil, in a storage chamber thereof. A stationary housing 11 is secured within the tank and has a filter assembly 12 (FIG. 2) removably mounted therein. In normal operation, a first pump 13 draws fluid from the tank and pumps it through a first conduit means 14 for use in a work system 15, such as a lubricating circuit for an engine, a working circuit for hydraulic cylinders, or the like. A second pump 16 functions to return the fluid via a second conduit means 17, to an inlet 18 formed on an underside of housing 11 (FIG. 2). The fluid then passes upwardly through the filter assembly and through an outlet 19 of the housing whereby it is returned to tank 10 via an elbow 20.

Referring to FIGS. 2 and 3, the filter assembly comprises an annular cover member 21 having a radial flange 22 detachably mounted on tank 10 and housing 11 by a plurality of circumferentially disposed cap screws 23. The cover defines a pair of chambers 24 and 25 therein which are normally blocked by a bypass valve means 26. The valve means comprises a spool 27 reciprocally mounted in a bore 28 formed in the cover and a compression coil spring 29, disposed between the spool and the cover, biases the spool upwardly to its closed position. Stop means in the form of a member 30 formed on upper end of the spool normally engages a large pan bolt 31, forming part of the cover, to hold the spool in its closed position.

Bolt 31 is axially aligned with the spool and is threadably mounted in a threaded aperture 32 formed through the cover to provide means removably mounted thereon to solely expose the bypass valve means. Threaded aperture 32 has an inside diameter slightly larger than the outside diameter of spool 27 to facilitate removal of the spool through the cover member. As mentioned above, conventional filter assemblies with bypass valves normally require complete removal of the filter assembly and disassembly thereof to remove the bypass valve for servicing purposes.

The filter assembly further comprises an annular support member 33 releasably attached to the cover member in axially spaced relationship therewith by an elongated bolt 34. A cylindrical screen 35 has its lower end secured to support member, as by an annular weld 36, and a cylindrical sealing gasket 37 secured to its upper end and slidably mounted within an annular recess 38 formed in the cover. A tubular cartridge-type filter 39 is disposed within the screen and is secured in place between the cover and the support member by bolt 34.

The outer periphery of the filter is positioned radially inwardly from screen 35 to define an annular passage 40 therebetween. Likewise, the screen is disposed radially inwardly from housing 11 to define an annular chamber 41 therebetween communicating directly with inlet 18. Magnet means, preferably in the form of a plurality of bar magnets 42, are disposed on an underside of support member 33 in axial opposition to inlet 18 and held in place thereon by a suitably formed retainer 43. The retainer, held in place by bolt 34 and a washer 44, is suitably stamped to define a plurality of radially outwardly extending and circumferentially disposed pockets 45, each retaining a bar magnet therein.

In operation, fluid normally flows from inlet 18 and through annular chamber 41, screen 35, passage 40, filter 39 and chamber 25. The latter chamber communicates with outlet 19 to return the fluid to tank 10 (FIG. 1). Bar magnets 42 will function to substantially uniformly disperse the fluid radially outwardly to annular chamber 41, whereby uniform filtering is achieved. In addition, the magnets will function to pick up metallic particles contained in the fluid flowing thereover.

When the fluid pressure in chamber 41, passage 40 and chamber 24 exceeds a predetermined level, such as when filter 39 becomes clogged, bypass valve means 26 will open. It should be noted that the fluid will still pass over magnets 42, through screen 35 and into passage 40 to filter-out contaminants of predetermined particle size. The partially filtered fluid will pass through the bypass valve means 26 whereby the fluid further passes directly into chamber 25 and through outlet 19 to the tank. Thus, screen 39 and magnets 42 will perform their respective functions both during normal filter operation wherein the fluid passes through filter 39 and also during the bypass operation whereby the filter is bypassed to communicate fluid from inlet 18 to outlet 19 directly.

I claim:

1. A removable filter assembly detachably mounted on and disposed within a stationary housing for removal as a unit therefrom, said housing having means defining an inlet at a lower end thereof and an outlet at an upper end thereof, said filter assembly comprising
   a cover detachably mounted on said housing,
   a support member attached to said cover in axially spaced relationship therefrom,
   a tubular screen disposed fully axially between and in sealing contact with said cover and said support member and further disposed radially inwardly from said housing to define an annular chamber therebetween communicating directly with said inlet,
   a tubular filter disposed within said screen to be substantially co-extensive axially therewith and positioned radially inwardly therefrom to define an annular passage therebetween which is isolated from said chamber totally by said screen, and
   bypass valve means mounted on the upper end of said housing, closely adjacent to said outlet, and movable between a closed position for sequentially communicating fluid from said inlet (1) into said chamber, (2) through the entirety of said screen, (3) into said passage, (4) radially inwardly through said filter, and (5) into said outlet and an open position sequentially communicating said fluid from said inlet (1) into said chamber, (2) through the entirety of said screen, (3) into said passage, (4) through said bypass valve means and (5) into said outlet directly when the pressure of fluid in said chamber exceeds a predetermined level.

2. The filter assembly of claim 1 further comprising a tank defining a storage chamber therein retaining a predetermined level of said fluid therein, said housing secured within said tank, a work system, first conduit means communicating with said storage chamber for selectively communicating fluid therefrom to said work system, and second conduit means communicating said work system with said inlet for communicating fluid thereto.

3. The filter assembly of claim 1 wherein said bypass valve means is solely removably mounted in said cover and means removably mounted on said cover for exposing said bypass valve means for permitting removal thereof through said cover.

4. The filter assembly of claim 3 wherein said means removably mounted on said cover comprises a bolt threadably mounted on said cover.

5. The filter assembly of claim 4 wherein said bypass valve means comprises a spool reciprocally mounted in bore formed in said cover in axial alignment with said bolt and having an outside diameter which is at least slightly less than the inside diameter of a threaded aperture formed through said cover to threadably receive said bolt therein.

6. The filter assembly of claim 5 wherein said spool comprises a stop means on an upper end thereof to normally engage said cover to hold said spool in a closed position and wherein said bypass valve means further comprises spring means disposed between said housing and said spool for biasing said stop member towards said bolt.

7. The filter assembly of claim 1 wherein said cover and said support member are attached together by an elongated bolt threadably mounted to said cover and wherein said cover engages an upper end of said filter.

8. The filter assembly of claim 1 further comprising magnet means attached on an underside of said support member in direct opposition to said inlet.

9. The filter assembly of claim 8 wherein said magnet means comprises a plurality of bar magnets disposed to extend radially outwardly on said support member and spaced circumferentially therearound.

10. The filter assembly of claim 9 further comprising an annular retainer attached to a bottom side of said support member and defining a plurality of radially disposed pockets therein, one of said bar magnets retained in each of said pockets.

11. In a filter assembly of the type comprising a cover detachably mounted on a stationary support, a tubular filter, first passage means for normally communicating fluid from an inlet to said filter assembly, through said filter and to an outlet thereof and bypass valve means for bypassing said filter to communicate said fluid from said inlet, through second passage means to said outlet directly, the invention wherein said cover completely covers one end of said filter and said bypass valve means is solely mounted in said cover and a bolt threadably mounted in an aperture formed through said cover for solely exposing said bypass valve means for permitting removal thereof from said cover, said bypass valve means comprising a spool reciprocally mounted in a bore defined in said cover, spring means disposed between said cover and said spool for normally urging said spool upwardly towards said bolt and to a closed position and stop means formed on an upper closed end of said spool normally engaging said bolt to position said spool at its closed position.

12. The filter assembly of claim 11 wherein said aperture has an inside diameter which is at least slighly greater than an outside diameter of said bypass valve means.

* * * * *